Figures 1, 2:
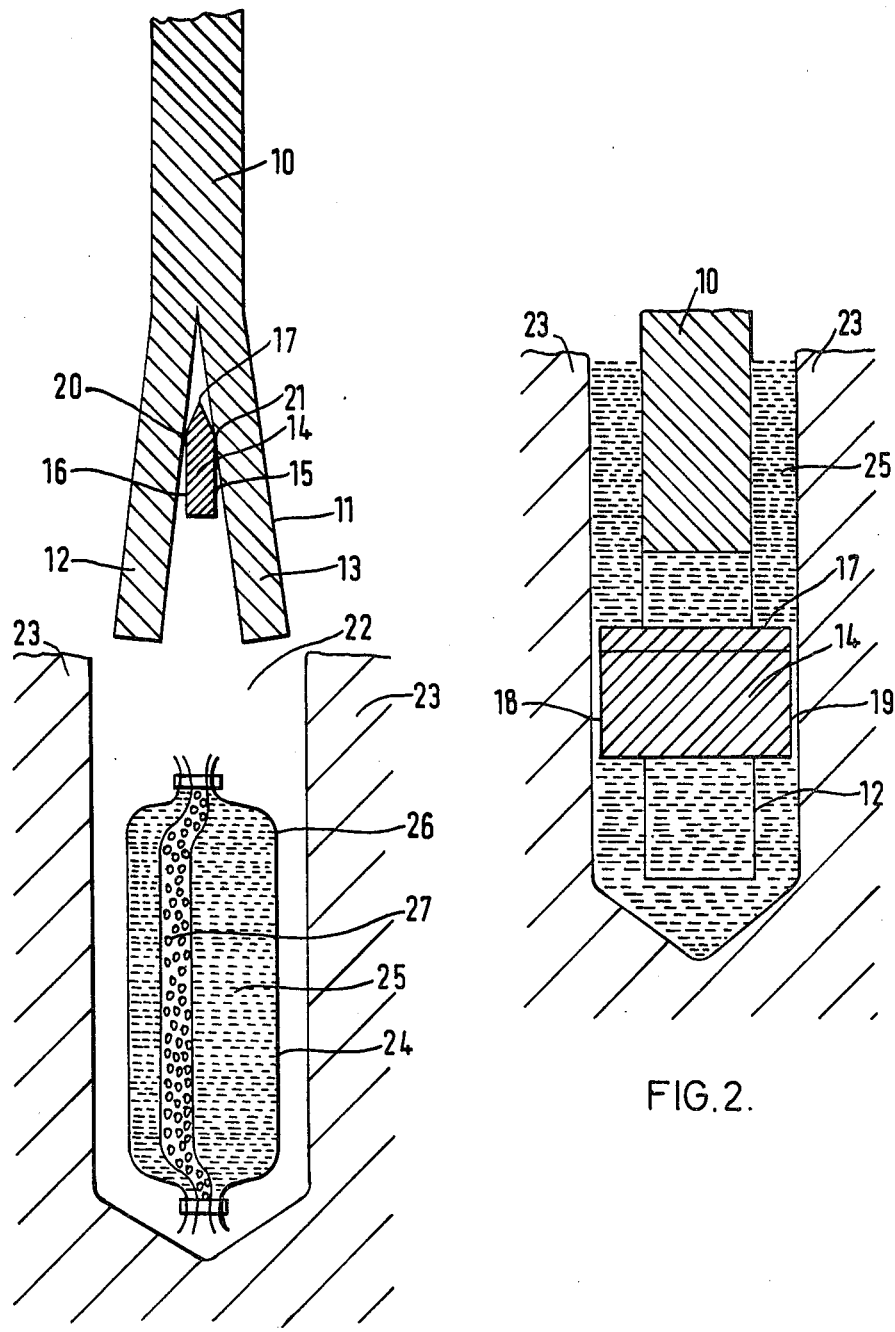

United States Patent [19]

Beveridge

[11] 4,167,359
[45] Sep. 11, 1979

[54] DOWEL DEVICE FOR GROUTING IN A DRILLHOLE

[75] Inventor: Robert L. W. Beveridge, Troon, Scotland

[73] Assignee: Imperial Chemical Industries Limited, London, England

[21] Appl. No.: 922,355

[22] Filed: Jul. 6, 1978

Related U.S. Application Data

[63] Continuation of Ser. No. 818,267, Jul. 22, 1977.

[30] Foreign Application Priority Data

Aug. 13, 1976 [GB] United Kingdom ............... 33803/76

[51] Int. Cl.² ............................................. E21D 20/02
[52] U.S. Cl. ......................................... 405/259; 85/79
[58] Field of Search ....................... 405/259, 260, 261; 85/79, 66, 26; 52/698, 704

[56] References Cited

U.S. PATENT DOCUMENTS

| 1,006,468 | 10/1911 | Des Isles | 85/26 |
| 1,896,810 | 2/1933 | Coyne | 405/116 |
| 2,587,907 | 3/1952 | Schroeder et al. | 85/26 |
| 2,697,914 | 12/1954 | Joy | 405/259 X |
| 3,455,200 | 7/1969 | Cumming | 85/79 X |

FOREIGN PATENT DOCUMENTS

| 152879 | 8/1953 | Australia | 405/259 |
| 1100773 | 9/1955 | France | 405/259 |
| 1293618 | 4/1962 | France | 405/259 |
| 1408366 | 10/1975 | United Kingdom | 405/259 |

*Primary Examiner*—Dennis L. Taylor
*Attorney, Agent, or Firm*—Cushman, Darby & Cushman

[57] ABSTRACT

A dowel device for resin grouting, comprising a dowel with a wedge member located in an opening formed in the insertion end whereby an end portion is radially expanded and flared outwardly. The invention also includes a method of reinforcing a hard medium and a method of providing an anchorage in a hard medium.

13 Claims, 2 Drawing Figures

DOWEL DEVICE FOR GROUTING IN A DRILLHOLE

This is a continuation of application Ser. No. 818,267 filed July 22, 1977.

This invention relates to an improved dowel device for grouting in a drillhole in hard material to provide reinforcement or anchorage means. The invention also includes a method of reinforcing a hard medium, a method of providing an anchorage in a hard medium, and a hard medium wherein the said dowel device is grouted in a drillhole in said medium.

The practice of grouting dowels such as reinforcing dowels or anchor bolts in hard medium such as, for example, hard rock is well established and has been described in British Pat. Nos. 953,056 and 1,408,366. In general the method consists in drilling into the medium a hole oversize with respect to the dowel and inserting the dowel with a surrounding layer of hardening grouting composition into the drillhole so that, on hardening of the grouting composition, the dowel is bonded to the drillhole wall. The dowel may terminate within the drillhole or it may extend beyond the mouth of the drillhole and be provided with fixing means for the attachment of other elements or holding a compression plate against the medium at the mouth of the drillhole. The dowel is preferably formed with a flared-out conical portion at its insertion end, which portion acts as a wedge on the grout material when the dowel is tensioned and thereby improves the holding power of the grout.

It is an object of this invention to provide an improved flared-end dowel device for grouting in a drillhole which can be quickly and simply made from plain dowel stock.

In accordance with the invention a dowel device for grouting in a drillhole comprises a dowel having a wedge member located in an opening formed in the insertion end of the dowel whereby an end portion of the dowel is radially expanded and flared outwardly.

When the dowel is grouted into the drillhole with a set grouting composition and is tensioned, either by an end load applied to the dowel end at the month of the drillhole or by deformation of the adjacent rock, the grout adjacent to the flared-end portion of the dowel is compressed and its holding power is thereby increased.

The dowel is conveniently split in one or more planes of cleavage extending from the insertion end of the dowel and the wedge member is inserted into the cleavage slit so as to spread the end segments. In the preferred form of dowel the end portion is split along a medial plane and a wedge member is placed in the cleavage slit to hold the end segments apart. The wedge member is preferably disposed in the cleavage slit so as to engage the end segments at a position spaced from the dowel end, leaving a surface portion of at least one segment between the said position of engagement and the dowel end free to flex inwardly under external pressure on the dowel. This disposition of the wedge member gives a most important practical advantage when the dowel is grouted in rock which undergoes plastic deformation after the grout has set. With a conventional dowel flared at its insertion end the tensile load will progressively increase until the dowel breaks whereas with dowels having the aforedescribed flexible end segment the tensile load will be partially released at a characteristic yield pressure and the dowel continues to support the grouting material. Several successive cycles of load increase and partial release can occur so that the reinforcing action of the dowel is maintained throughout substantial movement of the surrounding rock strata.

A convenient form of wedge member is a generally flat, rigid plate wit its two main faces parallel or convergent in the direction of insertion into the dowel end. Advantageously the leading edge of the wedge element is formed as a chisel edge which facilitates its insertion into the dowel end. If the dowels are made of wood or plastics material, a metal chisel edged wedge element, for example a steel element, may advantageously be driven into a plain dowel end to split and flare the end, and locate the wedge element in one rapid operation.

The wedge member preferably extends outside the side surface of the dowel so that the projecting portion assists mixing of the grouting composition when the dowel device is rotated in the drillhole. It is also preferred that, the said projecting side portion of the wedge element is provided with one or more cutting edges whereby the capsules of encapsulated grout components may be ruptured. The wedge element may be disposed symmetrically or eccentrically with respect to the longitudinal axis of the dowel and, when the dowel is used in a drillhole in soft material, an eccentric wedge element may advantageously be effective to score a groove in the drillhole wall and thereby provide a key for the grout. The dowel may be made from any constructional material which is sufficiently strong to reinforce grouting material and is sufficiently flexible to permit its end to be flared-out and held in the flared-out position by a wedge. Thus metals such as iron, copper and aluminium and alloys such as steel, brass and aluminium alloys are suitable. Wood and hard plastics materials are also suitable. An especially useful dowel may be made from resin bonded glass fibre and preferably the glass fibre is provided as filaments extending parallel to the dowel axis whereby splitting of the dowel end along an axial plane is facilitated.

Where the aforedescribed load release property is desirable the dowel preferably has a generally plain cylindrical surface but otherwise the cylindrical surface may be uneven and be provided, for example with projections, grooves or threads to enlarge its surface area and improve the binding to the grout.

The invention also includes a method of reinforcing a hard medium such as rock strata, or providing an anchorage in said medium, in which method a dowel device as described above, having its insertion end expanded and flared-out by means of a wedge member located in said end, is inserted into an oversize drillhole in the said medium with said insertion end adjacent to the blind end of the drillhole and a hardening grout material is disposed in the space between the dowel and the drillhole wall whereby, when the grout material hardens, the dowel is bonded to the drillhole wall. The grouting material may, for example comprise portland cement, calcium sulphate hemihydrate plaster or a thermosetting resin. Two-component encapsulated rapid hardening resins are especially convenient since the components may be dispersed and mixed by a wedge element which projects beyond the side surface of the dowel.

In order to illustrate the invention further, a preferred dowel device is hereinafter described, by way of example only, with reference to the accompanying drawings wherein FIG. 1 shows diagramatically in longitudinal medial section a dowel device ready for insertion into a drillhole in a rock mass;

FIG. 2 shows diagrammatically a longitudinal medial section of the dowel device of FIG. 1 in a plane penpendicular to the section of FIG. 1 after the device has been inserted in the drillhole.

The dowel device consists of a generally cylindrical dowel 10 which is split along a medial plane to provide a bifurcate portion 11 at the insertion end having end segments 12 and 13. The segments 12 and 13 are separated by a wedge element 14 which flexes the segments outwardly so that the end portion 11 flares out from the right cylindrical surface of the remainder of the dowel 10.

The wedge element 14 is a rigid flat rectangular plate with generally parallel transverse main faces 15 and 16 which are fined to converge at a chisel edge 17. The end faces 18 and 19 converge with the main faces 15 and 16 at sharp rectangular cutting edges. The wedge element 14 engages the segments 12 and 13 at positions 20 and 21 respectively and the segment portions intermediate these positions and the free segment ends are free to flex inwardly.

To grout the dowel device, capsules of two-component resin are inserted into a drillhole 22 drilled oversize with respect to the dowel device in rock mass 23. Each capsule consists of an outer container 24 containing hardenable resin 25 and an inner container 26, located entirely within the container 24 and containing hardening catalyst 27 for the resin 25. Both containers are made of thin easily rupturable thermoplastic material.

The dowel device is then simultaneously rotated and inserted into the drillhole 22, whereupon the capsules are engaged by the dowel segments 12 and 13 and the rectangular cutting edges of the wedge element 14. The thermoplastics containers are ruptured and the contents are mixed and flow into the space between the dowel 10 and the wall of the drillhole 22 where the resin subsequently hardens.

When a tensile load is placed on the dowel the resin between the flared-end portion 11 and the drillhole wall is compressed and its holding power enhanced. When the load is increased beyond a critical value, the tension is abruptly partially released probably due to inward flexing of the ends of the segments 12 and 13. The tension can then be increased again to the critical value.

In a specific example of dowel device the dowel was a rod 80 cm long×17 mm diameter made from axially oriented fibre glass filaments bonded by thermosetting resin. The wedge element was a generally rectangular fibreglass plate 32 mm×15 mm×4 mm thick located transversely in the split insertion end of the dowel with its chisel edge 17 at a depth of 3.3 cm from the dowel end, the dowel end segments being spread to an overall width of 32 mm. The dowel was grouted in a 30 cm×34 mm diameter drillhole in a rock mass with a polyester resin grout (which was initially encapsulated) and subjected to an axial pull. The load on the dowel was progressively increased up to 7 tons whereupon the flared dowel segments yielded and released the load to about 2 tons. The load on the dowel then increased again to the yield point at about 7 tons and was again released. The cycle of load increase and release was repeated and the cycle continued substantially in the same pattern whilst the dowel was withdrawn 10 cm along the drillhole.

What we claim is:

1. A dowel device insertable in a drillhole for grouting therein, said device comprising an elongate dowel element made of material capable of flexing under load, said dowel element having an end portion split into two substantially straight end segments, and a wedge member disposed in the opening between said segments in engagement with the inner faces of said segments to flare said segments radially, said wedge member being shaped so that the place of engagement with at least one of said segments is at a position spaced sufficiently from the dowel end that the end portion of said one segment is left free to flex inwardly under a predetermined tensile load on the dowel which is less than the tensile load required to break the dowel whereby the tensile load is partially released.

2. A device as in claim 1 wherein the wedge element is positioned in said opening so that it does not extend beyond the dowel end.

3. A device as in claim 1 wherein the wedge member is a generally flat rigid plate engaging the dowel end segments along two opposed corners on opposed faces of said wedge member.

4. A device as in claim 1 wherein the wedge member is a generally flat, rigid plate with its two main faces parallel or convergent in the direction of insertion into the dowel end.

5. A device as in claim 4 wherein the leading stage of the wedge member is formed as a chisel edge which facilitates its insertion into the dowel end.

6. A device as in claim 1 wherein the wedge member extends outside the side surface of the dowel element.

7. A device as in claim 1 wherein the dowel element is made from resin bonded glass fibre.

8. A device as in claim 7 wherein the glass fibre in the dowel is provided as filaments extending parallel to the axis of the dowel element.

9. A method of reinforcing a hard medium comprising inserting a dowel device into an oversize drillhole in said medium, said drillhole having an open outer end and a blind inner end, and said dowel device comprising an elongate dowel element made of material capable of flexing under load having an end portion split into two substantially straight end segments, and further comprising a wedge member disposed in the opening between said segments in engagement with the inner faces of said segments to flare said segments radially, said wedge member being shaped so that the place of engagement with at least one of said segments is at a position spaced sufficiently from the dowel end that the end portion of said one segment is left free to flex inwardly under a predetermined tensile load on the dowel which is less than the tensile load required to break the dowel, the end of said dowel device containing the wedge member being disposed adjacent the blind end of the drillhole; and disposing a hardening grout material in the space between the dowel element of said dowel device and the drillhole wall whereby, when the grout material hardens, the dowel device is bonded to the drillhole wall.

10. A method as in claim 9 wherein the grouting material is selected from the group consisting of portland cement, calcium sulphate hemihydrate plaster or thermosetting resin.

11. A method as in claim 10 wherein the grouting material comprises a two-component encapsulated rapid hardening resin.

12. A method of providing an anchorage in a hard medium comprising: inserting a dowel device into an oversize drillhole in said medium, said drillhole having an open outer end and a blind inner end, and said dowel device comprising an elongate dowel element made of material capable of flexing under load having an end portion split into two substantially straight end segments, and further comprising a wedge member disposed in the opening between said segments in engagement with the inner faces of said segments to flare said segments radially, said wedge member being shaped so that the place of engagement with at least one of said segments is at a position spaced sufficiently from the dowel end that the end portion of said one segment is left free to flex inwardly under a predetermined tensile load on the dowel which is less than the tensile load required to break the dowel, the end of said dowel device containing the wedge member being disposed adjacent to the blind end of the drillhole; and disposing a hardening grout material in the space between the dowel element of said dowel device and the drillhole wall whereby, when the grout material hardens, the dowel device is bonded to the drillhole wall and whereby the tensile load on the dowel can be released by flexing of said dowel segment.

13. A method of reinforcing a hard rock formation comprising: inserting a dowel device into an oversize drillhole in the formation, said drillhole having an open outer end and a blind inner end, said dowel device having an elongate dowel element one end portion of which has been split into two substantially straight end segments and a wedge member inserted into the split and flexing the end segments radially outwardly, the dowel element being constructed of resin-bonded glass fibre extending parallel to the axis of the dowel element and the wedge member being shaped so that the place of engagement with at least one of said segments is at a position spaced sufficiently from the the dowel end that the end portion of said one segment is left free to flex inwardly under a predetermined tensile load on the dowel which is less than the tensile load to break the dowel, and the wedge member being a flat rigid plate wholly disposed between the segments and having lateral edges which extend outside the surface of the dowel element, the wedge-end of the dowel device being disposed adjacent the blind end of the drillhole; and then bonding the dowel device to the wall of the drillhole by disposing a hardening grout material in the space between the dowel element and the wall of the drillhole and by rotating the dowel device so as to mix the hardening grout.

* * * * *